United States Patent
Echtler et al.

(10) Patent No.: US 8,863,928 B2
(45) Date of Patent: Oct. 21, 2014

(54) ASSEMBLY COMPRISING TWO SYNCHRONISER RINGS

(75) Inventors: Peter Echtler, Schongau (DE); Michael Koelzer, Rosshaupten (DE); Markus Sauter, Fuchstal-Leeder (DE); Thomas Schnelzer, Peiting (DE); Armin Siegmund, Peiting (DE); Wolfgang Voelk, Hohenfurch (DE)

(73) Assignee: Hoerbiger Antriebstechnik Holding GmbH (DE)

( * ) Notice: Subject to any disclaimer, the term of this patent is extended or adjusted under 35 U.S.C. 154(b) by 392 days.

(21) Appl. No.: 13/395,623

(22) PCT Filed: Sep. 3, 2010

(86) PCT No.: PCT/EP2010/005432
§ 371 (c)(1),
(2), (4) Date: Apr. 5, 2012

(87) PCT Pub. No.: WO2011/029559
PCT Pub. Date: Mar. 17, 2011

(65) Prior Publication Data
US 2012/0181138 A1    Jul. 19, 2012

(30) Foreign Application Priority Data
Sep. 14, 2009  (DE) .......................... 10 2009 041 517

(51) Int. Cl.
*F16D 23/02*    (2006.01)
*F16D 13/60*    (2006.01)
*F16D 23/04*    (2006.01)
*F16D 23/06*    (2006.01)

(52) U.S. Cl.
CPC ............. *F16D 23/025* (2013.01); *F16D 23/04* (2013.01); *F16D 2023/0637* (2013.01); *F16D 2023/0631* (2013.01); *F16D 2023/0618* (2013.01)
USPC ....................................... 192/53.3

(58) Field of Classification Search
USPC ....................... 192/53.1, 53.3, 108
See application file for complete search history.

(56) References Cited

U.S. PATENT DOCUMENTS

| | | | |
|---|---|---|---|
| 5,701,984 A * | 12/1997 | Park ........................... | 192/53.35 |
| 5,782,331 A | 7/1998 | Bailly et al. ............... | 192/53.32 |
| 5,865,287 A * | 2/1999 | Servoss ...................... | 192/53.31 |
| 6,205,876 B1 | 3/2001 | Schwuger et al. .............. | 74/339 |
| 6,216,550 B1 | 4/2001 | Schwuger et al. .............. | 74/339 |
| 8,245,828 B2 * | 8/2012 | Reisch et al. .............. | 192/53.31 |
| 2008/0004155 A1 | 1/2008 | Miyagoe ....................... | 475/303 |
| 2010/0051405 A1 | 3/2010 | Reisch et al. ................ | 192/69.7 |

FOREIGN PATENT DOCUMENTS

| | | | |
|---|---|---|---|
| CN | 101101053 | 1/2008 | ............. F16D 23/04 |
| CN | 101529110 | 9/2009 | ............. F16D 23/04 |
| DE | 43 24 814 | 1/1995 | ............. F16D 23/06 |
| DE | 4324814 | 1/1995 | ............. F16D 23/06 |

(Continued)

OTHER PUBLICATIONS

Chinese Office Action (translated) issued in related application No. 201080040954.5, dated Nov. 27, 2013 (5 pgs).
Chinese Search Report (translated) issued in related application No. 201080040954.5, dated Nov. 13, 2013 (3 pgs).

(Continued)

*Primary Examiner* — Jacob S Scott
(74) *Attorney, Agent, or Firm* — Hayes Soloway P.C.

(57) ABSTRACT

An assembly unit for synchronizing a manual gearbox, includes first and second synchronizing rings connected to each other, wherein the two synchronizing rings are connected to each other by a positive-locking connection.

14 Claims, 3 Drawing Sheets

(56) References Cited

FOREIGN PATENT DOCUMENTS

| | | | |
|---|---|---|---|
| DE | 19506988 | 8/1996 | ............. F16D 23/04 |
| DE | 10115355 | 10/2002 | ............. F16D 23/02 |
| DE | 102004036507 | 10/2005 | ............. F16D 23/06 |
| DE | 102006060534 | 6/2008 | ............. F16D 23/04 |
| DE | 102007036104 | 2/2009 | ............. F16D 23/02 |
| DE | 102008047484 | 4/2010 | ............. F16D 23/06 |
| DE | 102008047485 | 4/2010 | ............. F16D 23/06 |
| EP | 0955481 | 11/1999 | ............. F16D 23/04 |
| EP | 2194286 | 6/2010 | ............. F16D 23/06 |
| FR | 712597 | 10/1931 | ............. F16D 23/04 |
| GB | 418650 | 10/1934 | ............. F16D 23/04 |
| JP | 2007139166 | 6/2007 | ............. F16D 23/06 |
| JP | 2007/285400 | 11/2007 | ............. F16D 23/06 |

OTHER PUBLICATIONS

English translation of Japanese Office Action issued in corresponding Japanese Patent Application Serial No. 2012-528257 dated May 21, 2013 (4 pgs).

English translation of Korean Office Action issued in corresponding Korean Patent Application Serial No. 10-2012-7008646 dated May 24, 2013 (3 pgs).

International Search Report issued for related application No. PCT/EP2010/005431, dated Nov. 24, 2010 (4 pgs).

English translation of the International Preliminary Report on Patentability (8 pgs).

PCT International Search Report and Written Opinion issued in corresponding PCT Application No. PCT/EP2010/005432 dated Nov. 25, 2010 (13 pgs).

* cited by examiner

US 8,863,928 B2

ASSEMBLY COMPRISING TWO SYNCHRONISER RINGS

BACKGROUND OF THE INVENTION

The invention relates to an assembly unit for a synchronizing unit for a manual gearbox, comprising first and second synchronizing rings which are connected to each other.

An assembly unit of this type is known from DE 43 24 814 A1. The synchronizing rings are arranged on both sides of a sliding sleeve and provided with several protrusions which extend through recesses in the sliding sleeve. The two synchronizing rings are connected to each other by welding the protrusions to each other.

It is disadvantageous, on the one hand, that a large quantity of heat is introduced into the synchronizing rings during welding. This poses the risk that the material properties of the used alloy will change, in particular if there are hardened or quenched and tempered parts. On the other hand, manufacturing a weld seam with the required quality virtually in the interior of the shifting sleeve can only be achieved with large expenditure.

Thus, the object of the invention is to further develop an assembly unit of the type initially mentioned in that the two synchronizing rings can be coupled to each other with minimum expenditure.

SUMMARY OF THE INVENTION

In order to achieve this object, provision is made according to the invention in an assembly unit of the type initially mentioned that the two synchronizing rings are connected to each other by a positive-locking connection. In this way, the two synchronizing rings can be reliably connected to each other with minimum expenditure.

Preferably, provision is made that each of the two synchronizing rings comprises at least two connection tabs extending towards the respectively other synchronizing ring. This allows to connect the synchronizing rings to each other so as to extend through another component of the synchronizing unit, for instance a shifting sleeve or a transmitter.

According to an embodiment, provision is made that each of the connection tabs is provided with a positive-locking arrangement. This embodiment is based on the knowledge that a comparably simple undercut is sufficient to reliably connect the synchronizing rings.

Preferably, provision can be made that the positive-locking arrangement is defined by a connection protrusion on one of the synchronizing rings and a complementary reception opening on the other synchronizing ring. This allows to connect the two synchronizing rings to each other like two pieces of a puzzle with minimum expenditure, by inserting the connection protrusion of the one synchronizing ring in the reception opening of the other synchronizing ring.

Here, provision can be made that the positive-locking arrangement is freely movable in radial direction. This configuration is based on the knowledge that fixing the two synchronizing rings directly to each other in radial direction is not necessary, but that it is sufficient to bring about the radial fixation by the installation in the gearbox. To give an example, the positioning of the synchronizing rings by means of friction surfaces associated thereto or in a transmitter is sufficient to reliably avoid a disengagement of the positive-locking arrangement which is freely movable in radial direction.

According to an alternative configuration, provision is made that the positive-locking arrangement is defined by a reception opening in each of the two synchronizing rings, a separate connection element being provided which engages in the two reception openings. With such a separate connection element, too, both synchronizing rings can be connected to each other with minimum expenditure.

According to an alternative configuration, provision is made that the connection tabs are connected to each other by embossing. This allows producing the positive lock for connecting the two synchronizing rings with minimum expenditure, too.

According to a configuration of the invention, provision is made that the two synchronizing rings are identical. This increases the number of identical parts and hence decreases the unit cost. Costs for the logistics in provisioning various components are saved, too.

According to the invention and for achieving the above-mentioned objects, a structural unit comprising a transmitter and an assembly unit of the type mentioned above is provided, too. A structural unit of this type facilitates the assembly of the gearbox to a substantial extent, as it is not necessary during assembly to weld at a place deeply inside.

BRIEF DESCRIPTION OF THE DRAWINGS

The invention is described below on the basis of various embodiments illustrated in the attached drawings in which.

DETAILED DESCRIPTION OF THE INVENTION

Figure 1:
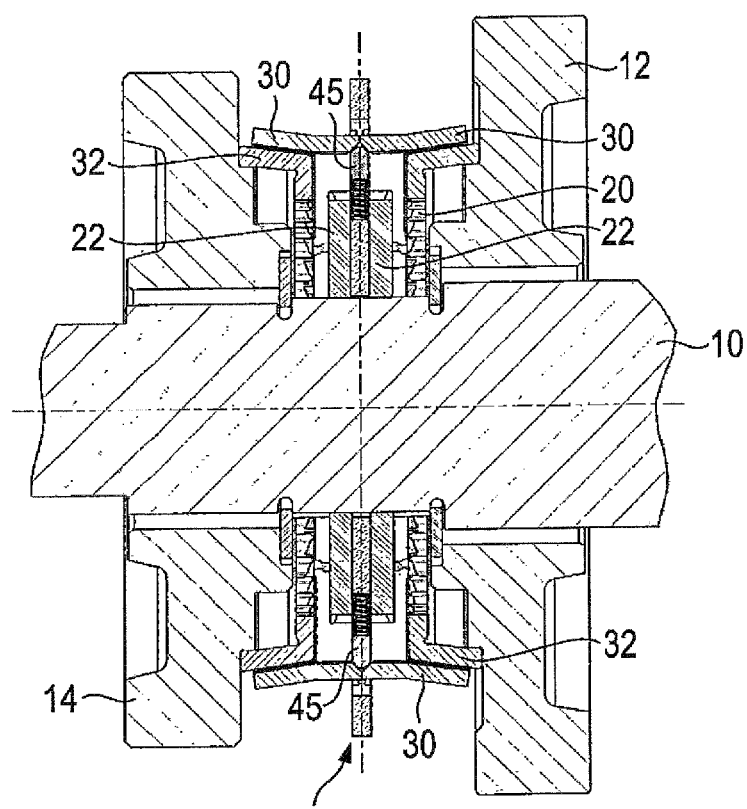
FIG. 1 shows in a schematic cross-section a synchronizing unit for a manual gearbox comprising an assembly unit according to a first embodiment of the invention.
Figure 2:
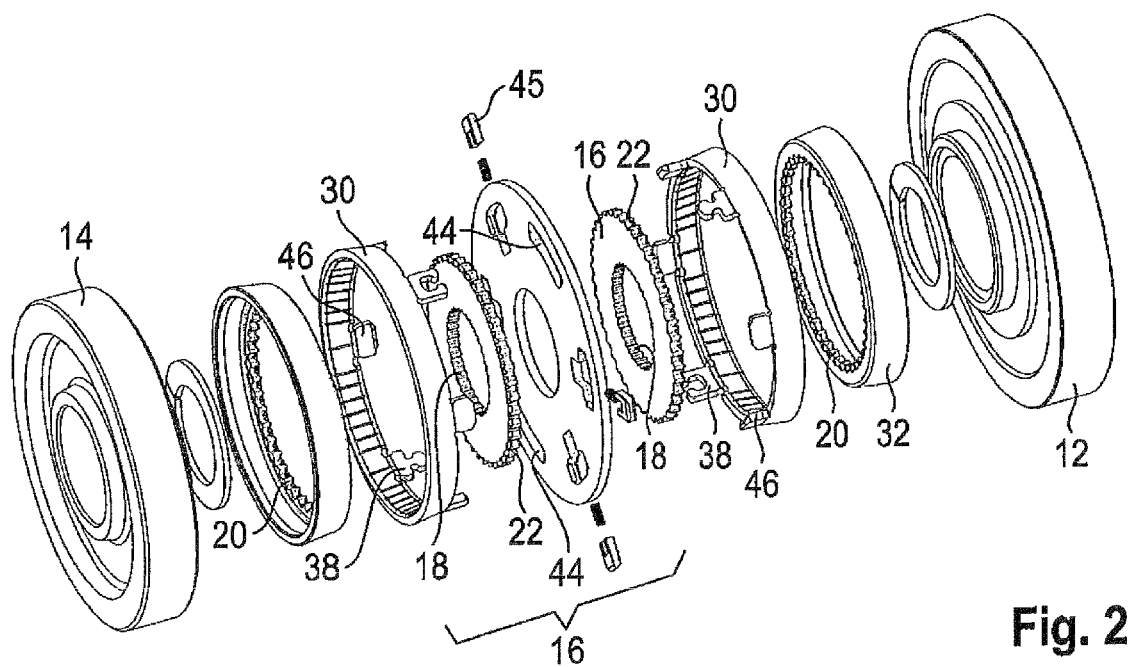
FIG. 2 shows the synchronizing unit of FIG. 1 in a schematic exploded view.

FIG. 1 shows a gear shaft 10 that has two gear wheels 12, 14 arranged thereon. The two gear wheels 12, 14 are part of a manual gearbox as it may be used in particular in motor vehicles. The further toothed wheels which are associated to them and with which the gear steps of the gearbox are effected, are not shown here, nor is a second gear shaft. The gear wheels 12, 14 are designed as idling wheels and are arranged on the gear shaft 10 so as to be able to rotate. In order to change the gear ratio, a rotationally fixed connection between the gear shaft 10 and the corresponding gear wheel 12, 14 has to be established. To this end, a transmitter 16 is provided here, mounted to the gear shaft 10 via toothings 18 in a torque proof manner, but so as to be movable in axial direction. The transmitter 16 is provided on both sides with one transmission toothing 22 each which can be brought to engage in a coupling toothing 20 associated to each gear wheel 12, 14.

If the gear ratio is to be changed, the transmitter 16 is shifted in axial direction on the gear shaft 10 by a shift fork or shift claw (not illustrated here) until one of the transmission toothings 22 engages in the coupling toothing 20 of the gear wheel 12 or 14 to be changed.

Two synchronizing rings 30 are provided to match the rotational speed of the gear wheel 12, 14 to be changed to the rotational speed of the gear shaft 10 prior to change the gear ratio; these synchronizing rings are arranged to the sides of the transmitter 16 and are able to cooperate with friction surfaces 32 associated to the gear wheels 12,14.

As the two synchronizing rings are realized so as to be identical, only one of the two rings will be described in the following. Each synchronizing ring 30 comprises a frictional body 34 formed so as to be annular. In the illustrated exemplary embodiment, each frictional body 34 has a slight outward conical taper starting from the transmitter 16. A frictional pad 36 is provided on the inner side of the frictional body 34. Depending on the frictional system which is used, a frictional pad may alternatively be used on the outer surface of the frictional body 34.

Starting from the frictional body 34, exactly two connection tabs 38 extend in axial direction, one of these being provided with a reception opening 40 and the other with a connection protrusion 42. The reception opening 40 is realized with an undercut, i.e. it comprises a constriction towards the free end of the connection tab. The connection protrusion 42 has a shape which is complementary to the reception opening 40, i.e. consists of a widened head at the end, connected to the actual connection tab 38 through a narrow web.

Figure 3:
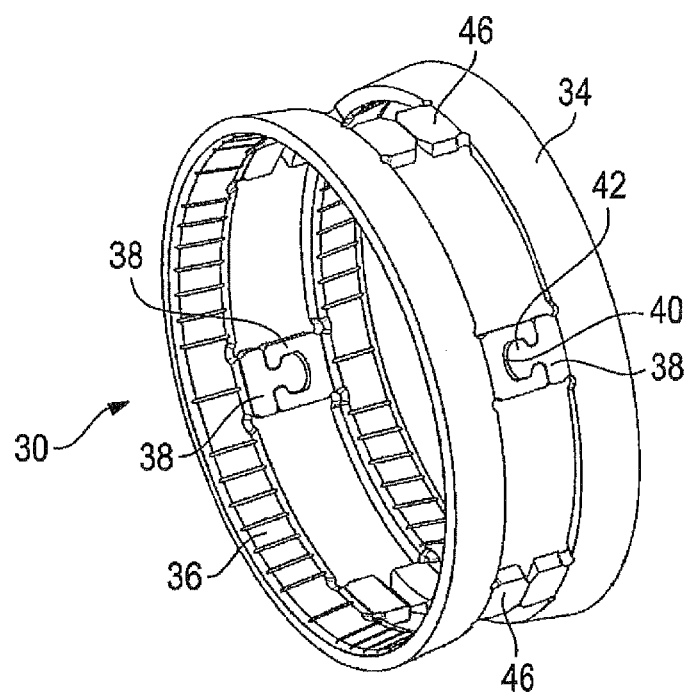
FIG. 3 shows the assembly unit according to the first embodiment in a perspective view.
Figure 4:
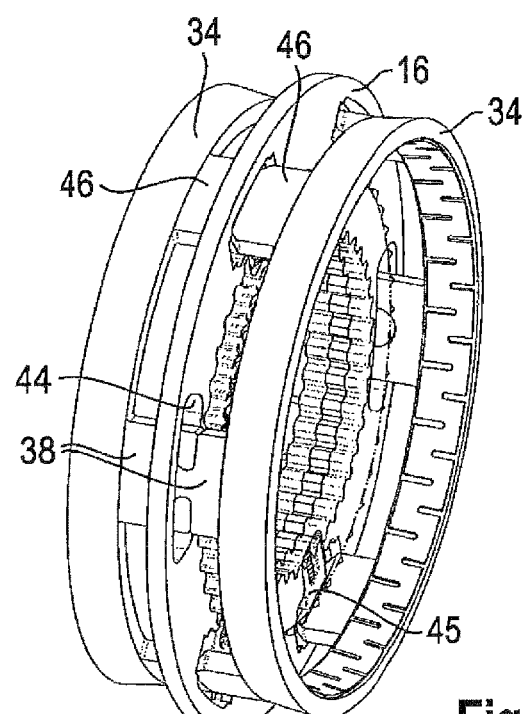
FIG. 4 shows the assembly unit of FIG. 3 mounted to a transmitter.

One of the two connection tabs 38 is provided with the reception opening 40 and the other connection tab is provided with the connection protrusion 42. As can be seen in FIG. 3, this allows the use of two synchronizing rings 30 of identical design, which are connected to each other in axial direction in that the connection protrusion 42 of the one synchronizing ring is inserted in the reception opening 40 of the other synchronizing ring. To this end, a synchronizing ring may be attached to the transmitter in such a manner that its connection tabs 38 fully extend through fixation openings 44 in the transmitter, i.e. so far that both the reception opening 40 and the connection protrusion 42 on the other side are freely accessible. Subsequently, the second synchronizing ring is mounted by inserting its connection protrusion and its reception opening just like two puzzle pieces in the reception opening and the connection protrusion of the synchronizing ring fixed to the transmitter 16. Relating to the later arrangement on the gear shaft, this is carried out in that the one synchronizing ring is shifted in radial direction relative to the other synchronizing ring, in fact on a diameter which extends through the two connection tabs 38. Finally, the assembly unit formed in this way and made up by the two firmly connected synchronizing rings is pushed back relative to the transmitter 16 to a center position in which the reception opening 40 and the connection protrusion 42 are within the fixation opening 44 (see FIG. 4). In this way, it is assured that the two synchronizing rings can not move relative to each other in radial direction to such an extent that the two positive-locking arrangements can be detached from each other.

In combination with the transmitter 16, a pre-mounted assembly unit is formed in this way in which the two synchronizing rings 30 are fixed in a centered position relative to the transmitter under the effect of thrust pieces 45; in this position, a disengagement of the positive-locking connection between the two synchronizing rings 30 is prevented.

The two synchronizing rings are additionally provided with further tabs 46 which are used for the locking function and the transmission of the synchronous moment. However, there is no correlation between the synchronizing unit and the present invention so that no further explanation is given here.

In place of the specifically shown reception opening 40 and of the connection protrusion 42, another geometric shape may also be used as long as a positive-locking connection is produced which is effective in axial direction. To give an example, the reception opening 40 could be L-shaped and the connection protrusion 42 could be formed with complementary shape as an L-shaped protruding tab.

Figure 5:
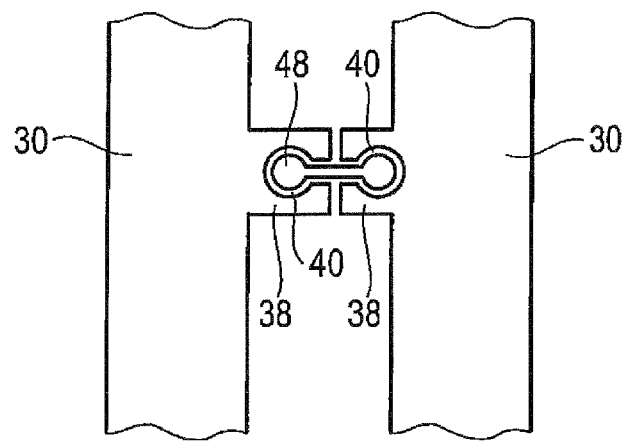
FIG. 5 shows a cut-out of an assembly unit according to a second embodiment of the invention.

FIG. 5 shows an alternative configuration, using a reception opening 40 on both synchronizing rings. The positive-locking connection between the two synchronizing rings 30 is effected here by a connection element 48 which basically is realized as an elongated piece and has a thickened portion on each end. Thus, the connection element 48 has a basically bone-shaped design. The connection element 48 may be maintained in engagement in the two reception openings 40 by suitable measures, for instance by pressing, caulking or embossing.

Figure 6:
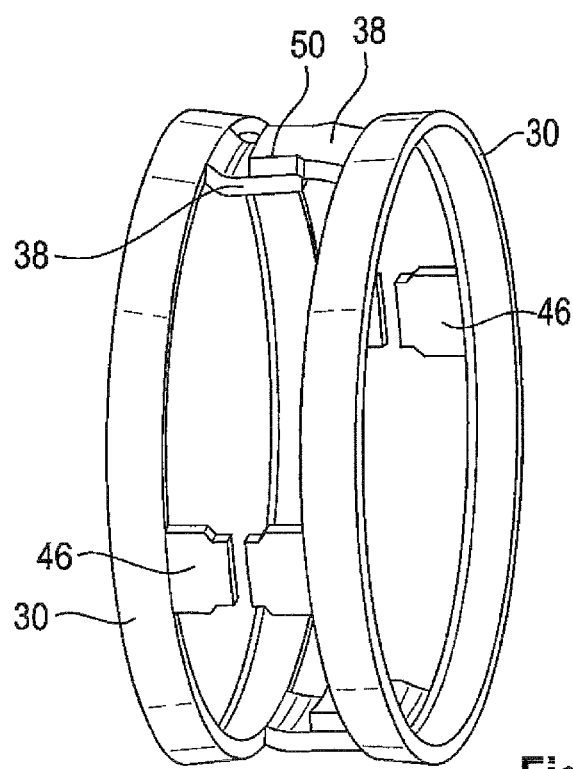
FIG. 6 shows an assembly unit in a perspective view according to a third embodiment of the invention.

FIG. 6 shows a further embodiment in which the positive-locking connection between the two synchronizing rings 30 is formed by an embossed portion 50 which is realized on the connection tabs 38. To this end, the two connection tabs 38 are realized with such a length that they overlap in the middle. In order to be able to use two identical synchronizing rings for this embodiment, too, each synchronizing ring has exactly two connection tabs 38, one of which being bent outwards with respect to a reference position and the other bent inwards. This allows to attach the two synchronizing rings to each other in such a manner that their connection tabs 38 rest precisely against each other in case of a centered arrangement.

The invention claimed is:

1. An assembly unit for synchronizing a manual gearbox, comprising first and second synchronizing rings which are connected to each other, wherein the two synchronizing rings are connected to each other by a positive-locking connection,
   wherein each of the first and second synchronizing rings comprises at least two connection tabs extending towards the respectively other synchronizing ring,
   wherein each of the connection tabs is provided with a positive-locking arrangement, and
   wherein the positive-locking arrangement comprises a connection protrusion on one of the synchronizing rings and a complementary reception opening on the other synchronizing ring.

2. The assembly unit according to claim 1, wherein the first and second synchronizing rings are identical.

3. A structural unit comprising a transmitter and the assembly unit as claimed in claim 1.

4. The assembly unit according to claim 1, wherein the positive-locking arrangement is freely movable in a radial direction.

5. An assembly unit for synchronizing a manual gearbox, comprising first and second synchronizing rings which are connected to each other,
   wherein the first and second synchronizing rings are connected to each other by a positive-locking connection,
   wherein each of the first and second synchronizing rings comprises at least two connection tabs extending towards the respectively other synchronizing ring,
   wherein each of the connection tabs is provided with a positive-locking arrangement, and
   wherein the positive-locking arrangement is freely movable in a radial direction.

6. The assembly unit according to claim 5, wherein the first and second synchronizing rings are identical.

7. A structural unit comprising a transmitter and the assembly unit as claimed in claim 5.

8. The assembly unit according to claim 5, wherein each connection tab of the first synchronizing ring is connected to an adjacent connection tab of the second synchronizing ring by embossing.

9. An assembly unit for synchronizing a manual gearbox, comprising first and second synchronizing rings which are connected to each other,
   wherein the first and second synchronizing rings are connected to each other by a positive-locking connection
   wherein each of the first and second synchronizing rings comprises at least two connection tabs extending towards the respectively other synchronizing ring,
   wherein each of the connection tabs in each of the first and second synchronizing rings is provided with a positive-locking arrangement being defined by a reception opening, and
   wherein a separate connection element is provided which comprises an elongated piece having two opposite ends and a thickened portion on each end, a thickened portion of each connection element engaging in a reception opening of the first synchronizing ring and an opposite thickened portion of each connection element engaging in a reception opening of the second synchronizing ring.

10. The assembly unit according to claim 9, wherein the first and second synchronizing rings are identical.

11. A structural unit comprising a transmitter and the assembly unit as claimed in claim 6.

12. An assembly unit for synchronizing a manual gearbox comprising first and second synchronizing rings which are connected to each other,
   wherein the first and second synchronizing rings are connected to each other by a positive-locking connection
   wherein each of the first and second synchronizing rings comprises at least two connection tabs extending towards the respectively other synchronizing ring,
   wherein each of the connection tabs is provided with a positive-locking arrangement, and
   wherein each connection tab of the first synchronizing ring is connected to an adjacent connection tab of the second synchronizing ring by embossing.

13. The assembly unit according to claim 12, wherein the first and second synchronizing rings are identical.

14. A structural unit comprising a transmitter and the assembly unit as claimed in claim 12.

* * * * *

UNITED STATES PATENT AND TRADEMARK OFFICE
CERTIFICATE OF CORRECTION

PATENT NO.        : 8,863,928 B2
APPLICATION NO.   : 13/395623
DATED             : October 21, 2014
INVENTOR(S)       : Echtler et al.

Page 1 of 1

It is certified that error appears in the above-identified patent and that said Letters Patent is hereby corrected as shown below:

In The Claims

Claim 11, Col. 6, line 2 "as claimed in claim 6" should be --as claimed in claim 9--

Claim 12, Col. 6, line 3 "gearbox comprising" should be --gearbox, comprising--

Signed and Sealed this
Twelfth Day of May, 2015

Michelle K. Lee
*Director of the United States Patent and Trademark Office*